United States Patent [19]
Prytz

[11] Patent Number: 5,557,677
[45] Date of Patent: Sep. 17, 1996

[54] METHOD AND ARRANGEMENT FOR COMMUNICATION OF INFORMATION

[75] Inventor: Sven E. Prytz, Lidingo, Sweden

[73] Assignee: Info Development & Patent AB, Sweden

[21] Appl. No.: 318,865

[22] PCT Filed: Feb. 17, 1994

[86] PCT No.: PCT/SE94/00133

§ 371 Date: Dec. 14, 1994

§ 102(e) Date: Dec. 14, 1994

[87] PCT Pub. No.: WO94/19893

PCT Pub. Date: Sep. 1, 1994

[30] Foreign Application Priority Data

Feb. 18, 1993 [SE] Sweden .................................. 9300543

[51] Int. Cl.6 ................................................ H04L 29/04
[52] U.S. Cl. ................ 380/20; 380/10; 380/16; 380/15
[58] Field of Search .................... 380/20, 10, 16, 380/15

[56] References Cited

U.S. PATENT DOCUMENTS 4,829,558  5/1989  Welsh .
4,962,529  10/1990  Saeki et al. ............................. 380/20
5,381,481  1/1995  Gammie et al. ......................... 380/49

FOREIGN PATENT DOCUMENTS

9220180  11/1992  WIPO .
9303569  2/1993  WIPO .

*Primary Examiner*—David C. Cain
*Attorney, Agent, or Firm*—Lerner, David, Littenberg, Krumholz & Mentlik

[57] ABSTRACT

In a transmitter, information for transmission is received in the form of a digital signal, electrical or optical, which is converted into short signal fragments, each of which is assigned an index. A transmitter module distributes these fragments to one or more receivers through a number of available communication channels, the choice of channel depending on the capacity and availability of the particular transmission channel. In the receiver, the signal fragments are coordinated according as they are controlled by means of their indices, to produce a signal capable of generating an information display.

18 Claims, 2 Drawing Sheets

FIG. 2

METHOD AND ARRANGEMENT FOR COMMUNICATION OF INFORMATION

AREA OF APPLICATION

The present invention refers to a procedure and a device for transmitting information, carried out by and comprised of a number of electronic modules and functions in accordance with the description contained in the introduction to patent claim 1.

STATE OF THE ART

Today, substantial quantities of information are transmitted by means of electronic devices and networks. This information may be in various forms—written in the form of alphanumeric characters, as still or moving pictures, or as sound in the form of natural or artificial speech—and may be generated with the aid of devices such as printers, plotters, cameras of various types and sound recording equipment. Networks designed to transmit electrical or optical impulses across greater or lesser distances are used for transmission purposes. For transmission by this means, the generated information must be converted into an suitable train of pulses in accordance with the coding system selected for transmission purposes, while these pulses must, when received, be decoded to produce useful information, corresponding to that transmitted, for use for the intended purpose.

Transmission and reception may take place in real time; in other words, coding may be carried out simultaneously with transmission and decoding simultaneously with reception. In many instances, however, the originally generated information may be stored in coded form in an electronic or optical memory, from which it is transmitted at a later time. In this case, the information stored in the memory often undergoes processing, such as readdressing or compression, allowing the subsequent utilisation time of the transmission channel to be shortened. The information may also be stored in similar manner at the receiving end for production in the desired form at a later time, following processing and/or decompression, if necessary. The information is usually stored on magnetically readable disks or tapes, or in optically readable, digital form (CD technology).

Clear distinction is made between a number of systems in the method of information transmission and storage described above. Thus, transmitter, receivers, transmission methods and networks which are completely different in technical terms are used to handle different types of original information, and for different application types and user groups.

Information directed selectively to a specific receiver or a limited group of receivers is usually transmitted over the telephone network, including both wire-guided and unguided (wireless) transmission from ground stations and/or satellites. As is known, speech is transmitted mostly in real time and interactively; in other words, by interchange of transmission and reception on both sides. The same telephone network is used for transmitting text over long distances. In this case, however, completely different transmission and receiving devices are employed—telex is used for written text alone, while the telecopier (or telefax machine) is used for text and images when the required picture quality is not especially high. Special image transmission devices are also used on the telephone network to transmit high-quality stills and colour pictures.

As an alternative, the transmission of text and images generated by computer, in which the material stored in the computer memory is transmitted directly without the need to produce a printed document, is now becoming more common. Reception may also take the form of direct storage of the information in a computer memory for production of the requisite documents, following processing, if required. Like direct transmission by telex or telefax, this method permits two-way communication inasmuch as a device which can be used for both transmission and reception is normally installed at each end. However, genuine interactivity, such as communication in the form of a conversation, is not possible, apart from the fact that certain databases are designed to permit a two-way exchange of queries and responses.

Completely different means, such as broadcasting from a radio or television transmitter, either ground or satellite-based, are required to transmit information to several receivers simultaneously. Local cable networks, often employing optical technology, are used to complement these means, particularly in satellite reception. Existing technology does not permit selective transmission to specific receivers or groups of receivers, apart from the fact that each transmitter covers a defined geographical area, within which, however, selectivity is not possible. On the other hand, the use of specially coded transmission signals facilitates selectivity at the receiving end, since the signal can be read only by a user employing a decoder to convert the signal into a useable form. These systems do not permit interactivity, except for the occasional use of a two-way exchange of internal information during production of the programmes to be transmitted.

The transmission of information over long distances carries the risk of unauthorised usage. The use of authorisation and distribution codes, as well as encryption of the information, are known methods of preventing this type of abuse. In earlier systems, the authorisation code has taken the form of a password entered on a keyboard or with the aid of a magnetic card, sometimes using a combination of both. Other measures of a personal or physiological nature, such as voice or fingerprint recognition, will not be discussed here. Although distribution codes may be produced in the same way, these are often entered in a database in the computer system to which access is obtained with the authorisation code. Protection against misuse of the transmitted information by eavesdropping is achieved in a known manner by scrambling or encryption.

Major demands are imposed on the impenetrability of the security system in a communications system featuring extensive and many-faceted utilisation of communications channels of different types. Authorisation codes, which must be memorised by the user, are subject to the risk of disclosure, sooner or later, often due to the necessity of programming the memory of the receiving computer with them. Identification media, such as magnetic cards, can be stolen or copied if made available to a third party for a brief period, or the details obtained by eavesdropping on the transmission. Encryption can be deciphered in most cases. While changing the codes and encryption methods may increase the level of security for a time, deciphering, once achieved, can usually be repeated.

TECHNICAL LIMITATIONS OF EXISTING SYSTEMS

In summary, the foregoing shows that two main systems are currently used for information communication by technical means: a network, herein referred to as the telecommunications system, to which a number of subscribers with access to both transmission and reception facilities are connected, and a system, hereinafter referred to as the broadcasting system, which employs a relatively small number of transmitting stations and a large, unspecified number of receivers, which are not provided with the facility of transmitting within the system.

One limitation of the telecommunications system is that all subscribers must be provided with some means of connection to the system. A further limitation is the fact that it is generally impossible, given the present state of the technology, to transmit a signal with a sufficiently broad frequency range throughout the network and its branches to permit the transmission of high-quality, moving colour pictures for interactive communication. The limitations of the broadcasting system, on the other hand, are that it is impossible to achieve genuinely selective transmission to specific receivers and that the feasibility of interactive communication is extremely limited.

Neither system is utilised to its full capacity. In the telecommunications system, since a high proportion of the communication takes place in real time, the level of utilisation rises and falls with the daily and weekly activities of the system consumers. The level of utilisation in the outermost branches of a telecommunications network, extending from an exchange to the individual subscribers, is generally extremely low. Capacity within the broadcasting system, especially within the television transmission sub-system, is poorly utilised, firstly because transmission at certain times of day are not of sufficiently broad appeal and secondly, because the high capacity of the transmission channels is utilised only to a limited extent with the types of signal transmitted at present.

DESCRIPTION OF INVENTION

The purpose of the present invention is to create means of utilising both of the systems described above jointly, in order to transmit information without the limitations imposed by the telecommunications system, particularly as regards the transmission of high-quality moving pictures, while exploiting the opportunities of selective transmission and interactive communication afforded by the telecommunications system, but not by the broadcasting system. This is achieved by interaction between the two systems and by utilising their excess capacity, especially within the TV signal broadcasting system.

A signal compression procedure, which is intended to permit transmission of a higher signal content per unit of time than is achievable with existing forms of signal, using the existing communication systems referred to above, is also described.

The widespread use of different communications media increases the demand for an advanced security system to prevent the misuse and dissemination of confidential information. It is important, especially when information is broadcast, to ensure that it can be used only by the intended recipient. The fulfilment of these requirements is another purpose of the invention. There is also an increased need for signal compression and signal shaping generally to ensure that those means required to exploit the excess capacity of different channel systems can be utilised. This is also a purpose of the invention.

DESCRIPTION OF FIGURES

The following pages contain a description of the system in terms of its structure and some of its components, as well as the system functions. In the description, reference is made to the following drawings.

PREFERRED EMBODIMENT

Figure 1:
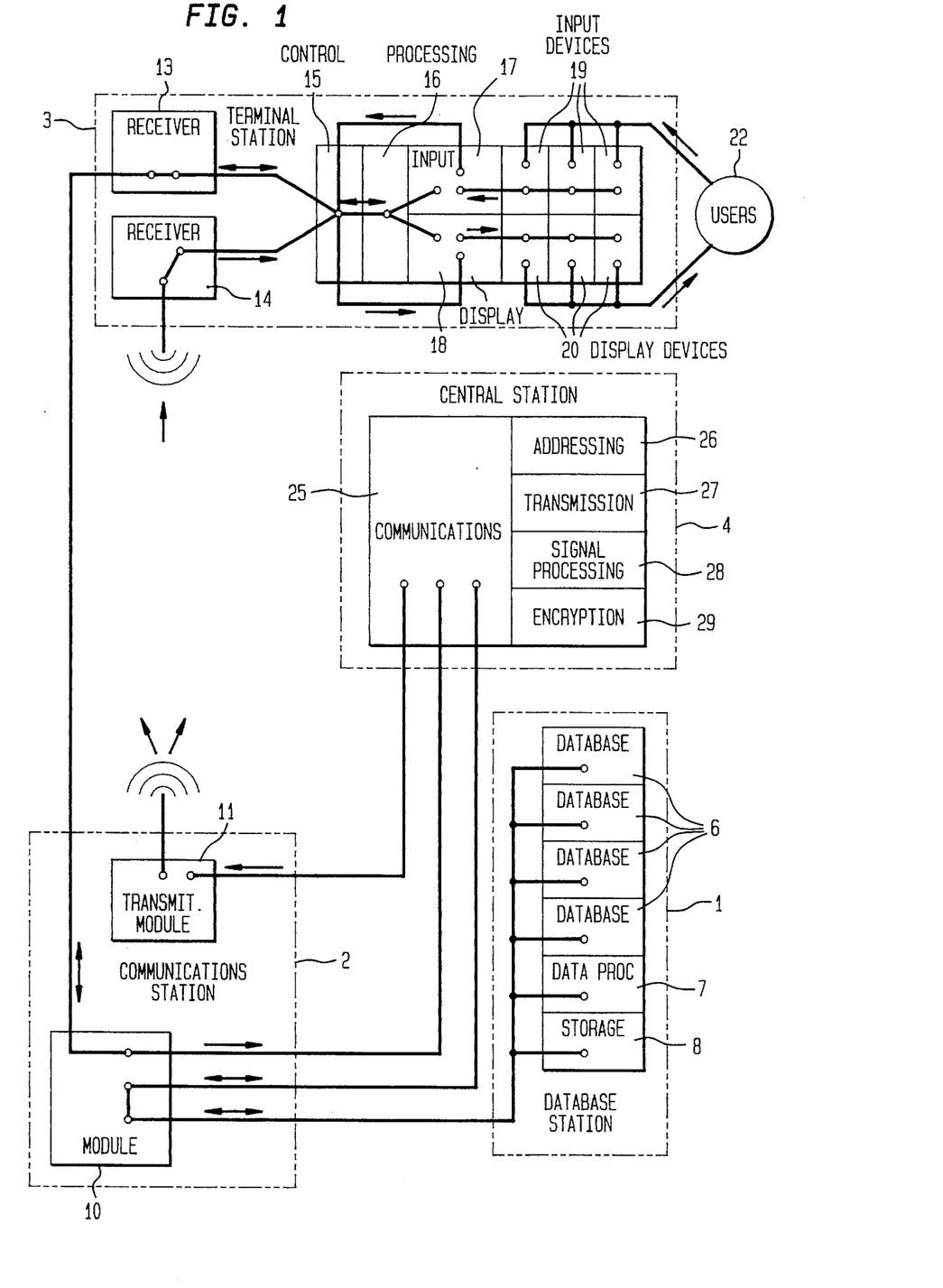
FIG. 1 which is a block diagram of the system.

FIG. 1 shows a possible configuration of a system designed to employ the invention and is partly of known type. The modules are arranged in stations which are shown within dash-dotted lines. These are the database station 1, the communications station 2, the terminal station 3 and the central station 4. The database station 1 incorporates databases 6, which are provided specifically for the system and/or are more generally available, and incorporate information search facilities. Data processing and storage modules, designated 7 and 8 respectively, are also assumed to be included.

The communications station 2 incorporates a module or sub-system 10, which may be connected to one or more networks to achieve selectively directed communication, previously referred to as a telecommunications system. Systems of this type are, at least to some extent, based on wire-guided communication. Unguided (i.e. wireless) communication employing ground stations or satellite links is used for transmission over long distances. Thus, a telecommunications system is characterised, not by its technical equipment, which may vary, but by the fact that the communication can be directed to specific receivers and that two-way communication is possible.

The communications station 2 also incorporates a module 11 for transmitting information which can be received by an unspecified group of receivers. Devices for this type of communication were formerly described as broadcasting systems. In this case, communication is usually achieved by wireless broadcasting from ground or satellite transmitters, either directly to the receivers or via local networks, which are supplied by a receiver of the broadcast signal. Pure wire-guided transmission is employed in some instances, involving some degree of integration between the telecommunications and broadcasting systems. However, a broadcasting system is generally characterised by the fact that communication is one-way and that the transmission can be received by a large, undefined group of receivers without the facility of selective transmission.

The terminal station 3 consists of a receiver module 13 for receiving signals from the telecommunications system, represented by the module 10, and a module 14 for receiving broadcast signals from the broadcasting system, represented by the module 11. The receiver modules 13 and 14 are connected to a control module 15, which is designed to convert the input signals into a form suitable for further processing in the terminal. The control module is, in turn, connected to the processing module 16, an input module and a display module 18.

The processing module 16 consists of a computer with data processing and storage functions. The input module 17 may incorporate a number of different devices 19, such as a keyboard for entering alphanumeric characters, a scanner or telefax for reading documents, one or more cameras for electronic recording of still pictures or moving pictures, and/or sound recording systems for recording speech, music or other types of sound.

The display module incorporates a number of devices 20 for displaying the information, such as a monitor for pictures, including moving pictures, a printer or telefax for producing documents and/or a sound reproduction system. Thus, the input module 17 and the display module 18 are designed to permit various forms of communication between the system and its user, which is designated 22 in the figure. As indicated in the terminal station diagram, communication using the communications module 15 may take place either directly from the input module 17 to the display module 18, or through the data processing module 16. In the direct case, communication takes place in real time relative to the outside environment, whereas when the processing module is used, both transmission of the input information and display of the received information can delayed in time by storing the information in the module. Information for transmission can be processed in advance, for example in graphical or computational terms, in the data processing module prior to transmission, while received information can be edited or otherwise processed for input into the appropriate devices 20. As also indicated, it is assumed that transmission from the input unit 17 takes place exclusively across the telecommunications system using the module 13, while reception can take place either via the telecommunications or the broadcasting system.

The control module 15, which will be described in detail later, is designed to control transmission and reception, and may also incorporate means of selecting received information, as well as security functions to protect the system against misuse and dissemination of the information.

The central station 4 incorporates a communications module 25 for the reception, distribution and transmission of information, for which purpose it is connected to the telecommunications system via the module 10 and to the broadcasting system via the module 11 and, thereby, to a number of terminal stations 3 and their users 22. In addition, the station is connected directly or (as indicated in the figure) through the module 10, in two-way communication with the database station 1 and its modules 6, 7 and 8. Whereas communication with the telecommunications system is also two-way, communication with the broadcasting module 11 is assumed to be one-way.

The central station 4 also incorporates a number of modules 26–29, which are connected to the communications module 25 for the purpose of receiving information-carrying signals, storing and processing these signals, and transmitting them further to selecting signal groups. The principal modules are:

A. Addressing module 26, whose functions include the onward transmission of signals from the various terminal stations, in accordance with the request associated with the respective signal for connection to the database in station 1, onward transmission of the signal to another terminal station, storage of the signal, and processing and/or editing of the data.

B. Transmission module 27 for transmitting information produced in or acquired by the central station, in accordance with a request from a particular terminal station, as received and recorded in the addressing module, for communication with the database station or other terminal station.

C. Signal processing module 28 for adapting the particular transmission signal to the method of communication to be used, and for adapting it to the receiver specification. Appropriate adaptation of the signal in shape and time, the latter when transmission in real time is not a prerequisite, can yield economic benefits by enabling the network in question to be utilised at high capacity. Economic benefits can also be achieved by signal compression and by eliminating unnecessary information. Digital signal processing is used mainly in this context. In particular, gains can be achieved by transmitting large quantities of information per unit of time; in other words, by using high-frequency signals. Compression also allows low-frequency networks, usually low-frequency telecommunications networks, to be used to transmit high-frequency information of this nature, mainly moving pictures such as TV signals. Although this type of signal is of high frequency, the transmission time is usually not utilised particularly well since the information transmission is interspersed with pauses while scanning takes place across the camera picture gate and the TV screen. Furthermore, in the cases of most pictures, the greater proportion of the picture is retransmitted as the complete image is varied at the rate required to convey an impression of movement, although only small sections of the picture may be changed over long periods.

Because of this, the signal processing module is designed to perform, firstly, such signal processing and transmission time delay as will afford optimum utilisation of the communications channel and, secondly, such image and signal processing as will adapt high-frequency signals to lower-frequency forms for transmission through channels, such as the telecommunications network, capable of accommodating signals of lower frequencies only.

The foregoing applies particularly when using telecommunications systems in which the cost of communication is dependent to a high extent on the utilisation time of the long-distance lines connecting the various local networks, and in which the transmission frequency, or the quantity of data transmitted per unit of time, is limited, and the transmission quality is often limited and somewhat unreliable. The achievement of improved conditions in these respects is, naturally, a matter of interest not only in the context of transmission from the central station, but also as regards transmission from each terminal. In the case of some terminals, at least, there is reason to provide the equipment necessary to reduce the cost of communication and achieve higher transmission quality.

The conditions which prevail in transmission using the broadcasting module 11, which is assumed to be one-way, are different. In this case, as a general rule, it may be assumed that a sufficiently wide frequency range is available and the transmission quality is high, which applies primarily to TV transmitters. However, the achievement of sufficient transmission capacity to serve a large number of terminals with a relatively small number of transmitters poses a problem, in addition to which the transmitters are used in normal broadcasting service during a large part of the day. However, as already mentioned, signal utilisation is less than full even when TV programmes are being transmitted. For this reason, the signal processing module must also be designed to supply a signal to the broadcasting module in question to enable such periods to be utilised. For optimum utilisation of these periods, the transmission signal is compressed to enable as much information as possible to be transmitted. In this case also, the terminals, which must be capable of receiving a signal broadcast in this manner, must be equipped with a signal processing module capable of decoding the periodically transmitted signal and to decompress as required.

D. Security and distribution module 29 to protect against misuse or undesirable dissemination of the information, whether transmitted from the terminals or from the central station. This is achieved, firstly, by encrypting the actual information carrying signal and, secondly, by applying an authorisation code to at least some of the commands and orders. A distribution code can be used to ensure that a transmission from the central station reaches the correct receiver.

Signal encryption is performed in the signal processing module on command from the security and distribution module. Even the signal processing carried out to optimise utilisation of the communications channels involves a certain degree of encryption, which can be used for selection by group. A particularly high level of security can be achieved by linking the signal with an authorisation code. Special coding may also be desirable in the case of transmission from the central station. In this case, the signal is linked, not with an authorisation code, but with a distribution code, which determines which terminal or terminals will be capable of receiving the signal. In general terms, it should be possible to use the same devices for the production and use of both authorisation and distribution codes, and to carry out encryption. A device of this type will be described later.

The central station 4 also incorporates service modules. The information service with which the various terminal users are provided originates in the database station 1 and its various modules, which contain information on different subject areas in addition to services for different types of data processing and storage. The central station can also be equipped with its own service modules.

As described above, the central station 4 may be regarded as an "exchange" between the individual terminals, and between the terminals and database station, as well as the central station service modules, using the most suitable communications channel selected by the central station on each occasion of transmission without requiring the system to be tied to a specific communications system. Thus, the central station is designed to independently select the most suitable communications channel on each occasion, conferring a suitable and optimum shape and position in time on the signal, while ensuring that the signal is distributed to the correct receiver or group of receivers.

A communications system incorporating stations of different types has been described in the foregoing. Communication between these stations must be achieved by means of systems of the two main types defined as telecommunications and broadcasting systems. An essential feature of the present invention is the manner in which the signal is processed to facilitate a high degree of utilisation of the potential capacity of the communications systems. Three principal methods viz. compression, fragmentation and coordination are used to achieve this objective.

Among other things, compression may mean that those parts of the information which have already been generated in the receiver are not transmitted in full, but are assigned an indication only, enabling them to be incorporated in the total material on the basis of the information already stored by the receiver. As an example, if information required to construct an image is to be transmitted, a simple signal indicating the nature and extent of some parts of the image, such as those which are completely black or white, may be transmitted instead of a train of signals to build up those parts successively. Within certain special areas, use is made only of a limited number of concepts and/or picture elements, which can be identified in advance, and transmission can be confined to sending these identifications instead of the total information.

When transmitting moving pictures, in other words, a large number of successive images which generate the impression of movement, a high proportion of these images will be completely identical, while the movement and, as a result, the successive change in the picture content will be confined to a small portion of the picture area. Thus, when transmitting TV pictures, in which each image is scanned and transmitted as though it were unique, an extremely high quantity of information which has already been received by the receiving device is transmitted again. In the case of such material, a known method is to divide the signal representing the material into frames, which are compared with frames transmitted already, so that the signal for a particular frame need not be retransmitted but is replaced by a signal with the shorter identification. A signal processing method of this type is known as fractal compression.

Fragmentation means that the signal is divided into short time fragments, which are transmitted over correspondingly short time intervals, during which no information transmission takes place within the particular communications system. An example is provided by the pause which occurs between the generation of each line during a TV transmission, to permit transmission of the additional textual information which appropriately designed TV receivers can produce either for or simultaneously with the television image. Another example is time sharing, or the alternate transmission of short signal segments from different transmitters to different receivers. In these known applications of fragmentation, all of the time fragments are transmitted in sequence, one after another, in the order in which the signal representing the information has been produced and is subsequently reassembled in the receiver.

However, this need not be the case in the procedure employed in the invention, in which the fragments may be transmitted in a sequence independent of the order in which they have been generated from the information material and that in which they will be used to reproduce the corresponding material in the receiver.

Coordination means that each signal fragment is assigned a position index and that the receiver is provided with a corresponding table of indices to enable the incoming signal fragments to be assembled into a complete and correctly ordered information signal.

To facilitate an understanding of the manner in which these main elements are used, an example of information transmission will be described with reference to FIG. 2.

Figure 2:
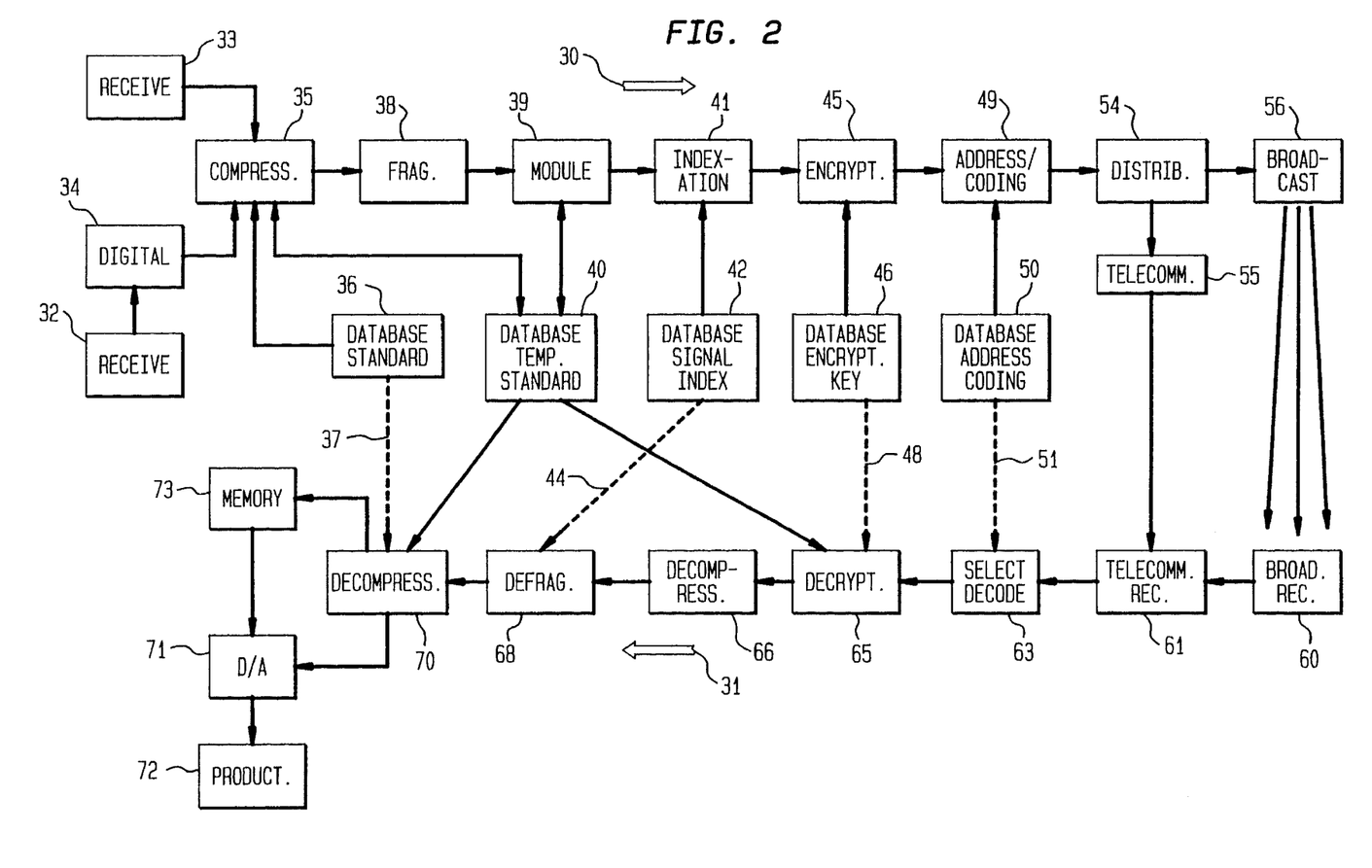
FIG. 2 in which transmission and reception signal processing is exemplified.

Signal processing modules are represented by boxes in FIG. 2, in which processing of the transmitted signal flow, as indicated by the arrow 30, is represented by an upper row. Processing of the signal in the receiver is represented by a lower row, in which the flow is indicated by the arrow 31. Generation of the signal from the information material to be transmitted is indicated at the extreme left of the upper row. This material may be in analogue form, such as images, text or sound, and is received in a known manner in a module 32. However, the information may also be supplied in digital form to a memory, in which it may be stored, for example, in magnetic or optical form. A module 33 is used to receive this information. The analogue signal from the module 32 is digitalised in a module 34 and the signal, which is now exclusively in digital form, is supplied to a module 35 for compression. Known methods, such as fractal compression, may be used to perform compression, while another method is used to assign identification to frequently repeated information frames, shortening the transmission time compared with that required for the complete information. Thus, the information can be transmitted to the receiver without the necessity of retransmitting a signal frame every time it occurs in the material. This is represented by a module 36, which may be referred to as a database for standard information. Standard information of this type is agreed in advance between transmitter and receiver. Standard data are generated by the sender and transmission to the receiver may be accomplished in various ways, for example by separate telecommunications transmission or by physical transmission by means of a memory carrier (ROM). These alternative methods of transmitting the same data are indicated by the dashed arrow 37.

The aforementioned process of fragmentation, or division of the signal into short time increments, is performed in a module 38 following compression of the undivided signal in the module 35. In many cases, this fragmentation may be followed by further compression as additional, repeated information frames are identified with the division of the signal into short time elements. These may then be assigned an index instead of the full information content, producing a new generation of indexed data in addition to the aforementioned standard data. Generation of this type may also be performed in the compression module 35 if frequently repeated signal frames occur in addition to the standard data assumed prior to transmission. A module 40 is included to detect such data, which might be referred to as temporary standard data. This module is required to perform the transmission of temporary data of this type, together with its identifications, to the receiver as part of transmission, so that a temporary database can be generated in the receiver. Together with the fragmented and subsequently compressed main signal from the module 39, the temporary data are fed from the module 40 to a module 41 for indexation of the signal frames. Since these indices, as already described, define the positions of the signal fragments within the total body of transmitted material, the fragments need not be transmitted in a specified order in time, and may even be divided between different transmission channels yet reassembled as a unit in the receiver. This assumes that the indices assigned to the fragments for transmission to the receiver can be related to positions in a coordination chart to enable the fragments to be reassembled into a correct whole. Thus, the receiver must be provided with information describing the principles of indexation. This is afforded by a database 42, the information in which controls signal indexation in the module 41 and coordination in the receiver. For this purpose, the receiver must have access to this information prior to or during transmission which, like transmission of the standard data, may be accomplished by telecommunications or by physical transmission. In this case also, these options are indicated by a dashed arrow 44.

The signal may be encrypted in an encryption module 45 if the information is to be kept secret and protected against eavesdropping. Although compression, fragmentation and indexation inherently provide considerable protection against unauthorised use of the signal, additional security may be required in some cases. An encryption key stored in a database 46 is required to decode a specially encrypted signal of this type in the receiver. This, therefore, controls the encryption in the module 45 and data are transmitted to the receiver either by telecommunications or by physical transmission as indicated by the arrow 48. The next module in the signal path may be referred to as an addressing and coding module 49. A secure address code must be used, especially if the signal is broadcast for reception by only one or a limited number of receivers. In addition to the address, a code of this type incorporates the authorisation of the transmitting party so that spurious signals can be excluded. This is necessary, for example, in financial systems, in which spurious orders may give rise to substantial financial losses. Addressing and coding must also be based on mutual understanding between transmitter and receiver, which is accomplished by controlling the module 49 from a database 50 containing data on the addressing and coding principles.

These data must be available to the receiver and may be transmitted by telecommunications or physical transmission as indicated by the dashed arrow 51. A special system for address and authorisation coding of this type, which affords additional security, is described below. Data transmission from the databases 36, 40, 42 and 46 can also be performed in accordance with the coding system principles, which are described later.

The further processed signal is supplied to a module 54 for distribution of the signal fragments to different transmission channels, represented by a module 55 for transmission by a telecommunications system and a module 56 for broadcast transmission. In this context, it is not necessary to provide only one module of each type; transmission may be conducted alternatively or simultaneously across different telecommunications networks or different broadcasting transmitters, particularly TV transmitters.

The lower row in FIG. 2 illustrates the construction of the receiver terminal, which consists of a module 60 for receiving the broadcast signal and a module 61 for receiving the signal from the telecommunications system. These signals are monitored in a selection and decoding module 63. A number of signals which are not addressed to the specific receiver may arrive at the receiver module 60, particularly if the signal is transmitted by broadcasting. In this case, the selection module will relay only those signals which are adequately addressed. The transmission authorisation is monitored even if the signal in a particular channel is assigned a pre-agreed coding. The data for selection and decoding are obtained from the database 50 by one of the alternative methods already referred to.

A decryption module 65 may be provided for encrypted signals. The now accepted and decrypted signal is fed in its still-fragmented form for initial decompression in a module 65 which, therefore, is performed at fragment level. Data from databases 36 and 40 may be used for this purpose if standard data or temporary data assigned identifications have been used in transmission.

In the following stage, the indexed fragments, now decompressed to their signal content, are coordinated in the correct time sequence in a module 68, for which access to indexing data is required. This requires a memory with immediate access to various positions with indices corresponding to those assigned to the transmission signal fragments. This enables the position of each fragment in the time sequence of the finally generated signal to be determined.

Thus, this process of constructing the complete signal may be performed by collecting signal fragments from different communications channels and systems, their position in time being such that economic utilisation of the communications channels is achieved. The fragments may also be distributed between the different communications channels according to their content. For example, high-frequency signals representing cinematographic images may be transmitted from a TV transmitter, whereas signals with a limited information content may be transmitted over a telecommunications system. This arrangement renders unauthorized use of the signal even more difficult.

When coordinating or constructing the complete signal, some signal frames may be found to be missing, for example due to transmission or reception errors. To deal with this contingency, the coordination module may be designed to perform a final check on the character and integrity of the signal. If necessary, missing information may be requested from the transmitter by specifying the indices of the fragments which require to be retransmitted. In this context, if the original transmission was broadcast, it may be preferable to transmit the retransmission request and the repeat transmissions themselves by telecommunications since the need may be extremely selective.

However, the finally assembled signal remains in the compressed form produced originally in the module 35. Decompression of the signal is now performed in a module 70, if necessary while collecting data from the modules 36 and 70. Apart from the fact that it is still digital, the signal is now in a form suitable for display. For this reason, it is passed to a digital/analogue converter 71 before being supplied to appropriate modules 72 for production as a monitor display, as a printed document, as sound or by some other means. As an alternative, a finally processed signal, still in digital form, may be stored in a memory 73 for subsequent or repeated display.

Clocking and time synchronisation can be an important aid to signal processing in the transmitter and receiver, and when determining the time of communication, as well as in the successive transmission of signal fragments distributed, if required, among different communications channels.

A clock pulse is an important aid in signal processing, while synchronisation between transmitter and receiver is valuable in communication. In this context, time synchronising signals may take the form either of synchronising signals transmitted between the transmitter and receiver, or a common link with the world time clock or other available time signal.

The terms 'transmitter' and 'receiver' have been used in the foregoing. However, as indicated by the description of FIG. 1, these terms should not be interpreted as meaning that one device is a transmitter only and the other a receiver only. On the contrary, interactivity between the devices is an essential element of the present invention.

In a typical configuration, therefore, the system incorporates an information material adminstrator, such as the central station 4 in FIG. 1, from which the substantial transmissions originate, the receivers consisting of a number of terminal stations, such as that designated 3 in FIG. 1. However, each terminal station is equipped with transmission facilities for communication with the central station, which must be provided with reception facilities for this purpose. In this context, the communication from the terminal stations may be assumed to relatively small in volume consisting, for example, of orders for information material, instructions for database searches, and so on.

Thus, in a typical configuration, the terminal stations communicate with the central station by means of the telecommunications system during the interactive phases, while the central station transmits large quantities of data to one or more terminal stations simultaneously by means of TV transmitters. Transmission may be take place, either in whole or in part, across the telecommunications system, especially when transmitting limited quantities of data to individual terminal stations.

For example, in practical application, the central station may be envisaged as having access to a large number of TV programmes of an hour or several hours in duration, which can be ordered by the terminal stations for replay at a chosen time. In this case, transmission of the equivalent quantity of data is carried out as described, following compression, enabling the transmission time to be cut to a few seconds or minutes. The terminal stations which order the material select the appropriate transmission and records the material in a storage medium, which is required only during the short time occupied by the transmission. The material may subsequently be replayed at a chosen time, undergoing decompression and digital/analogue conversion in the process.

As already mentioned, a special addressing and authorisation coding has been developed. This may also be useful for encryption and for the transmission of data required for signal processing to the receiver (cf. databases 36, 42, 46 and 50). The procedure is described below.

In the following description, the system is assumed to incorporate a user terminal which, in FIG. 1, is represented by the terminal station 3, and a host computer, represented by a central station 4. Several terminal stations are connected to the host computer, although the system illustrated in the figure shows a central 'exchange' for communication with host computers which, as already mentioned, may include databases and computational computers, as well as computers used to carry out financial transactions. In the following description, the expression 'terminal' is used to denote the group of terminal stations and the expression 'host computer' the computer/database which must be available to the terminal(s). Thus, the task to be solved is to establish a code processing system for authorisation codes relating to orders and commands from the terminal, to verify the identity of the terminal user, and for distribution codes associated with the transmission of acknowledgements and information from the host computer to the terminal, ensuring that the correct addressee, and only that addressee, is accessed.

The terminal is assumed to incorporate a computer equipped with a keyboard and some type of display. The keyboard is intended for data entry by the terminal user and be of a standard or enhanced type. However, the use other means of data entry, such as voice-recognition devices, is not excluded. In a more permanent installation, the display may take the form of a monitor. However, that section of the terminal which is dedicated to the security function or, at least, elements of that function, may take the form of a smart card with a display in the form of a character window and with an integral microprocessor with storage facilities. In this type of application, the terminal identity is integrated in the card and, regardless of whether different terminal stations (compatible with the system in which the operation is carried out) are used, the terminal will be connected, in the host computer, to the identity represented by the card if it is used in the terminal station.

Thus, this section of the terminal station, which represents the aforementioned identity, is referred to in the following as the security module and may take the physical form of a module integrated in a terminal or of a separate smart card. The host computer is equipped with a corresponding security module for distribution security and, although this may be assumed to be integrated in the computer, it may obviously, as an alternative, comprise a separate entity.

As a 'compromise' alternative, the card may incorporate a microprocessor with storage capacity, but without operating keys and, unless required, without a display. In this case, the card must be used together with a computer and display to use the security system.

The function of the security system—in other words, its security modules—is as follows:

1. PROGRAMMING

At a starting time, the terminal and host computer security modules are jointly programmed with a security code which is variable with time and/or with the utilisation sequence. Thus, the security modules should feature clock control. The authorisation code at the terminal should normally be comprised of a code which is readable by the security module and a memorised code which is entered by the user on each occasion of use. The memorised code may be omitted in instances in which the security module can be protected against unauthorised use, for example by safe storage of the user card. Alternatively, the machine code may be omitted, permitting the use of different terminals even if a card is not available However, since neither of these alternatives is likely to be of interest in a more demanding security context, the use of both a machine code and a memorised code would represent the normal case.

Both the machine code and the memorised code, or either one alone, may be changed on a time basis. However, there is little reason for not altering both, although this may be done at different time intervals. A change based on the utilisation sequence, such as the introduction of a new code after each usage, may be considered as an alternative or a complement to a direct, time-based change by means of a clock pulse. A table-based change, preferably related to the date and, if appropriate, the time of the transaction, may also be considered.

If the machine code only is changed, this may be carried out simply by synchronising the changes in both security modules.

For maximum security, the code program is generated in the host computer, the hardware of which is designed so that the program can be transmitted only once and in conjunction with programming of the card with the coding system. Programming from the host computer may be carried out directly at the computer; for example, a single, centrally located terminal may be used for programming cards, affording an extremely high level of security.

In long-distance transmission of the data for programming terminals with the coding system, these are coded jointly with the host computer using a similarly variable coding system. Thus, 2 coding system transmitted from the host computer is coded in turn. The codes disclosed when programming in a card is not valid on the next occasion; thus, a type of cascade system of variable codes is created.

2. APPLICATION

As described above, a continuously variable code is used for communication. New codes are introduced constantly by the synchronised clocks and/or the counters used with the host computer and card. In addition, the stepping of new codes is preferably dependent on the use of the card.

If a code is successfully deciphered by an eavesdropper on the communications line, it will be useless for the purpose of the next since a new code will then apply.

The design of the security module hardware shall be such that the coding system cannot be ascertained from it. However, if the entire coding system is successfully copied from the module by some means or another, the copy will be of extremely limited value since the use of two means of identification, the original and the copy, will disrupt the stepping function each time they are used. Since the host computer and original coding system will no longer be synchronised, neither the original nor the copy will be usable. This will indicate to the user of the original that a copy has been made.

Authorisation to access a computer system is derived primarily from possession of the security module. Although this, admittedly, cannot be used in copy form, irrespective of whether the copy is made during the basic programming or subsequently, it is possible that the card may be stolen and used for a period before the theft is discovered, for which reason it is usually necessary to introduce a complementary authorisation system. As already mentioned, the authorised user is assigned an authorisation code which he or she memorises, ensuring that the code is not technically recorded anywhere but in the host computer. Inherently, the security system provides better protection of the authorisation code than other systems, due to the much higher security which it affords against detection of the machine code by eavesdropping during transmission, all communication between the terminal and host computer being linked to a code which is impossible to decipher.

However, this is not entirely sufficient. Experience of other systems shows that memorised codes can be detected by eavesdropping on entry of the code or by carelessness; the employee may disclose the code by writing it down or by lending the card. While problems of this nature should not, of course, occur, they do arise from time to time.

In the system, the memorized codes, as well as the machine code, may be stepped. Since this is varied successively as the card is used, a code detected by eavesdropping will be useless when the card is next used.

However, the authorized user must know which code is to be used on each particular occasion. In the system, this can be achieved by using an algorithm, an instruction rather than a code or password as such, which is memorized by the user. The instruction, combined with an algorithm which is displayed by the terminal, determines the authorization code to be entered. The algorithm displayed by the terminal, for example on a card display, is varied constantly on a time and/or utilization basis.

This means that a code/password entered on one occasion of use will be invalid on the next occasion. Thus, a code of this type deciphered by eavesdropping on the line or at the point of entry will be useless if another attempt is made to use it.

If an authorized individual discloses the entire instruction/ algorithm directly to another party, verbally or in writing, system security will naturally depend on the trustworthiness of the individual who has received the information. However, the system can be configured so that the algorithm valid on the next occasion can be requested from the security module, enabling the authorized user to determine the entry code for that occasion. Thus, if compelled to permit another party to use the security module, the authorized user need not disclose the memorized algorithm, but only the code valid for use on the next occasion, in addition to which the safety module can be blocked to prevent it from disclosing details of the current algorithm on the said occasion. This eliminates the temptation for a party to attempt to ascertain the principles of code generation. The code disclosed to another party in this manner will be valid on a specific occasion only or, alternatively, for a given period of time, after which a new entry code will apply.

The basic concept is, therefore, that a security module, such as a smart card, is used to obtain access to the computer system via a terminal. The microprocessor in the card is designed and complemented so that it provides memory and clocking functions. In its simplest form, on a first level of development, the card is of approximately the same size and shape as a conventional passive card with a magnetic strip. The card is used only to gain access to the terminal for the purpose of transmitting and receiving data.

On the second level of development, the card incorporates a display and a larger memory, enabling certain data to be retained and displayed. In addition, the card should be provided with a simple keyboard for selecting the data to be displayed.

On the third level of development, the card is expanded to include more comprehensive data entry facilities, preferably an alphanumeric keyboard. The display facilities should also be expanded by providing a relatively large display. Added to this is a special communications system for transmission between the card and a terminal linked to the host computer. It is sufficient for the terminal to be provided with a surface on which the card may be placed. No connections, for example for connecting some type of connector, are required and the terminal may, therefore, be totally enclosed.

Alternatively, the functions of the card and terminal may be integrated in a single unit for mobile use and for connection, for example, to a telephone line.

In the foregoing, the variable code has been described only in terms of its reference to the authorization code which must be used to gain access to the host computer, and to the distribution code required for secure addressing when supplying a specific terminal or terminal group with information from the host computer. The variable code or a special control code (also variable) may, under the security system, be used for variable encryption of the transmitted information. In many cases, it is insufficient to protect the access authorization and distribution codes; it is also desired to keep the information secret. In such cases, scrambling or encryption in accordance with a specific system is employed. However, if this is deciphered, an unauthorized party may gain an opportunity of reading the information in plain text. Under the system, however, the principles for achieving variability of the scrambling or encryption rules can be entered jointly in the security module and host computer when configuring the security system. Thus, even if one of these principles is successfully identified by an unauthorized party on any occasion, the knowledge will be useless on the next occasion.

Overall, the information transmission system and security system described in the foregoing afford optimum utilization of different communications systems and combination techniques, while affording an extremely high level of security. The latter is necessary if, as in the communications system, is intended to employ different communications channels under different ownership and affording widespread distribution, and if this is difficult to achieve under such conditions.

At the receiver, the signal is processed using a coordination chart to assemble the segments as they are stored following reception. As already described, the information is transmitted in the form of fragments, which may reach the receiver in an order different to that in which they must be arranged as part of overall information reception. The fragments may also reach the receiver through different communications systems and may require to be coded differently.

The coordination chart in question is repeated to ensure that the total information can be assembled despite this. The chart is programmed with the correct, individual positions and, in applicable instances, with the coding data relating to each fragment on the basis of the indices assigned to each segment. This means that each fragment received is assigned the correct position within the material and is decoded using the correct decoding data, for storage in a digital memory prior to outputting and/or final storage in the receiver.

When the estimated or advised time of transmission of the total material is reached, this coordination process also permits verification that the material is complete, by checking if the coordination chart has been completed fully. It is not unusual that certain parts of the signal are lost or become unreadable during communication, regardless of whether wire-guided or unguided (wireless) communication is employed. In the event that one or more signal fragments is missing, the receiving device is programmed to request their retransmission.

Within the present concept, in which it is assumed that several methods of communication may be used, the communications media may be interchanged to perform this complementary transmission. For example, if the main transmission has been broadcast from a TV transmitter, the complementary information may be requested through the telecommunications network and may be transmitted across it.

Once the full quantity of information has been received, coordinated and decoded, it is converted into the desired form for display or intermediate storage.

The procedure described for transmitting information offers a number of advantages:

Different communications channels can be used and utilization can be distributed in time between different receivers, depending on whether the information is to be transmitted to a large number of receivers or to individual receivers, and on the capacity of the different receivers to receive different channels.

Maximum use can be made of existing communications channels by transmitting segments during periods when no other transmission is in progress.

The transmission time can be utilized in optimum manner by compression and by eliminating the need for control signals or handshaking, since missing information can be transmitted afterwards.

Two-way communication is enabled in a previously unknown manner by the possibility of using different transmission channels. As an example, a TV transmitter can be used to transmit information to a large number of receivers, while the telecommunications network can be used to provide these with interactivity for placing orders, delivering return information etc. to the information transmitter.

In addition, it is clear that a fragmented signal, which must be coordinated and decoded in accordance with a given pattern, will be extremely difficult to intercept by unauthorized parties. Even if certain frames are intercepted, or even the entire communication, it will be difficult for the unauthorized party to assemble the fragments correctly, in the correct sequence and with the correct decoding.

The decoding chart must be established prior to transmission of the main information. The chart, or different variations of it, can be transmitted to the receiver in various ways: as part of the information transmission, at an earlier time than the information transmission or physically in the form of a data carrier (ROM).

I claim:

1. A method for transmitting information from a transmitter to a receiver comprising:

generating a signal carrying said information, generating signal fragments from said signal by fragmenting said signal into time increments based upon the time priority, addressing conditions, information content and signal character agreed-to between said transmitter and receiver, assigning an index to each said signal fragment, said index specifying the time position of said fragment within said signal, providing a coordination chart to said transmitter and receiver, said coordination chart identifying which index corresponds to which time position within said signal, selecting at least one channel based on the loading, cost structure and transmission capacity of the channel relative to the character of the signal and based on the selective addressing facilities of the channel and the prevailing risk of unauthorized utilization, transmitting said signal fragments on said selected channel from said transmitter to said receiver, reassembling, at said receiver, said signal from said signal fragments with the aid of said coordination chart.

2. The method of claim 1 wherein said coordination chart is provided to said transmitter and said receiver before said step of generating a signal carrying said information.

3. A method of compressing a signal for transmitting information from a transmitter to a receiver, said method comprising generating a signal carrying said information, compressing said signal into a compressed signal, generating signal fragments from said compressed signal by fragmenting said compressed signal into time increments, analyzing each said signal fragment to ascertain the feasibility of further compression, further compressing said signal fragments depending upon the results of the analysis, and transmitting said compressed signal fragments from said transmitter to said receiver.

4. The method of claim 3 wherein said compression of said signal and said signal fragments further comprises providing a database to said transmitter and receiver, said database containing frequently-occurring signal frames and corresponding compression indices identifying said frequently-occurring signal frames, and replacing said frequently-occurring signal frames in said signal and signal fragments with said corresponding compression indices, wherein said step of reassembling further comprises replacing said compression indices with said corresponding frequently-occurring signal frames.

5. The method of claim 4 wherein said database comprises a first database and second database, said first database comprising standard information relevant to most signals generated between said transmitter and receiver, said second database temporarily containing frequently-occurring frames associated with a particular signal or signal fragment being transmitted, and further comprising transmitting said second database as part of the transmission of said particular signal or signal fragment.

6. A method of security coding a transmission of information from a transmitter to a receiver, said method comprising providing to said transmitter and receiver a chart which is variable with time and/or with the utilization sequence such that different encryption is applied on different occasions of communication between said transmitter and receiver;

said chart comprising encrypted address codes and/or authorization codes and/or encryption procedures, and applying address codes and/or authorization codes and/or encryption procedures during transmission from said transmitter to said receiver to protect said information from unauthorized access.

7. The method of claim 6 further comprising generating signal fragments from said signal by fragmenting said signal into time increments, assigning an index to each said signal fragment, said index specifying the time position of said fragment within said signal and encrypting said indices into said chart, providing a coordination chart to said transmitter and receiver, said coordination chart identifying which index corresponds to which time position within said signal, transmitting said signal from said transmitter to said receiver, reassembling, at said receiver, said signal from said signal fragments with the aid of said coordination chart.

8. The method of claims 6 or 7 wherein said chart is designed for most foreseeable occasions of communication and further comprising providing said transmitter and receiver with said chart prior to said step of transmitting.

9. A system for transmitting information as a signal from a transmitter to a receiver comprising said transmitter comprising at least one module for receiving the information to be transmitted and at least one module for processing said signal, said at least one module for processing comprising at least one module for dividing said signal into short time fragments and linking said fragments with coordination indices, and comprising at least one module for distribution of said signal fragments between a group of communications channels connected to said transmitter while adapting the choice of channel for each signal fragment to the character and priority of the fragment, to the capacity of the channels relative, to the character of the signal and to the transmission availability, and comprising at least one module connected to the communications channels of said transmitter, said receiver comprising modules for processing the received signal fragments, said modules including a module for coordinating the individual signal fragments in accordance with the respective indices to produce a coordinated signal, and at least one module for generating a display of the information.

10. A method of transmitting information from a transmitter to a receiver comprising:

generating a signal carrying said information, generating signal fragments from said signal by fragmenting said signal into time increments, assigning an index to each said signal fragment, said index specifying the time position of said fragment within said signal, providing a coordination chart to said transmitter and receiver, said coordination chart identifying which index corresponds to which time position within said signal, transmitting said signal fragments on at least one selected channel from said transmitter to said receiver, reassembling, at said receiver, said signal from said signal fragments with the aid of said coordination chart.

11. The method of claims 1, 3, 6 or 10 wherein said step of generating a signal further comprises generating said signal in a transmission station and supplying said signal to a communications system including said transmitter.

12. The method of claim 6 wherein said communications system comprises a telecommunications network.

13. The method of claim 6 wherein said communications system comprises a broadcasting system.

14. The method of claim 8 wherein said transmitter is a television transmitter.

15. The method of claims 1 or 10 wherein said character of said signal comprises the frequency of the signal.

16. The method of claims 1, 3, 6, or 10 further comprising said receiver generating a display from said signal.

17. The method of claims 1 or 10 wherein said step of transmitting comprises transmitting said signal fragments on at least two different selected channels.

18. A system for transmitting information from a transmitter to a receiver comprising:

means for generating a signal carrying said information, means for generating signal fragments from said signal by fragmenting said signal into time increments means for assigning an index to each said signal fragment, said index specifying the time position of said fragment within said signal, means for providing a coordination chart to said transmitter and receiver, said coordination chart identifying which index corresponds to which time position within said signal, means transmitting said signal fragments on said selected channel from said transmitter to said receiver, means for reassembling, at said receiver, said signal from said signal fragments with the aid of said coordination chart.

* * * * *